United States Patent [19]

Slinn et al.

[11] Patent Number: 4,736,621

[45] Date of Patent: Apr. 12, 1988

[54] LEAN TESTING OF ELECTRICAL OR ELECTRICAL COMPONENTS

[75] Inventors: David S. L. Slinn; David E. M. Wotton; Colin R. Sargent, all of Bristol, Great Britain

[73] Assignee: I.S.C. Chemicals Limited, Borax House, London, Great Britain

[21] Appl. No.: 882,234

[22] Filed: Jul. 7, 1986

[30] Foreign Application Priority Data

Apr. 4, 1985 [GB] United Kingdom ................ 8516948

[51] Int. Cl.$^4$ ............................................ G01M 3/06
[52] U.S. Cl. ........................................................ 73/455
[58] Field of Search .............................. 73/40.7, 45.5; 324/158 R

[56] References Cited

U.S. PATENT DOCUMENTS

| 2,459,780 | 1/1949 | McBee | 174/17 LF X |
| 3,548,636 | 12/1970 | Litant | 73/40.7 |
| 3,738,158 | 6/1973 | Farrel et al. | 73/40.7 |

OTHER PUBLICATIONS

Krause, *Cooling Electronic Equipment*, 1965.

Primary Examiner—Reinhard J. Eisenzopf
Assistant Examiner—Stephen M. Baker
Attorney, Agent, or Firm—Holman & Stern

[57] ABSTRACT

A method of leak testing electrical or electronic components, by immersion in an inert liquid at a temperature above 100° C., to detect any bubbles arising from the component, after which the component is removed from the liquid and drained, wherein according to the invention the liquid in which the component to be tested is immersed comprises predominantly perfluoroperhydrofluorene, $C_{13}F_{22}$.

3 Claims, No Drawings

LEAK TESTING OF ELECTRICAL OR ELECTRICAL COMPONENTS

This invention relates to a method of leak testing electrical or electronic components, such as circuit boards, microchips, integrated circuits, etc., and is particularly concerned with finding a suitable leak-testing liquid which may be advantageously used in such a method.

There is expressed need in the electronics industry for a liquid composition which is suitable for leak testing electronic components by immersion and bubble-observation at elevated temperatures (e.g. between 100° and 200° C.) Methods of testing are detailed in U.S. Military Standard 883B (Method No. 1014), and also U.S. Military Standard 202F (Method 112).

This liquid must exhibit the following combination of properties:

(a) Chemical inertness—there must be no chemical attack whatsoever on the components being tested.

(b) Thermal stability—since thermal breakdown of organic compounds generally produces carbon, and tars, which are liable to deposit on the components under test, it is essential that the liquid be stable to prolonged exposure to heat, up to a temperature of 200° C.

(c) Very low inherent toxicity.*

(d) No formation of toxic decomposition products under prolonged exposure to normal operating conditions.*

*This is because the tanks in which these tests are run have open tops (to admit the components under test) and exposure of the operators to volatile toxic vapours is not acceptable.

(e) Excellent dielectric properties (e.g. electrical resistivity greater than $10^{13}$ ohms/cm at 500 V DC, high electrical breakdown strength as specified in British Standard BS148). These properties must be unchanged by the prolonged testing of a large number of components, and the liquid must have no adverse effect whatsoever on the electrical properties of the component being tested.

(f) Very low surface tension (generally below 20 dynes per cm.). This is because the sensitivity of the test procedure declines in direct proportion to an increase in the surface tension.

(g) Excellent compatibility with all materials used in the components under test. There must be no swelling of, or adsorption into, polymers and no corrosion of metals.

(h) The liquid must evaporate without leaving a residue, to avoid contamination of the components under test.

(i) The liquid should be of low viscosity and high density, to minimise losses caused by adherence of the fluid to the components on removal from the test bath ("drag-out" losses).

(j) The boiling point and vapour pressure of the liquid must be high enough to allow the test to be carried out, yet low enough to allow rapid evaporation of residual liquid from the surface of the component after removal from the test tank. A relatively low latent heat of evaporation is advantageous for the same reason.

We have now found a liquid which satisfies all the above requirements, particularly the requirement (d). It should be noted that certain previously used materials were liable to form toxic decomposition products (e.g. the highly poisonous perfluoro-isobutylene) at hot spots on electrical heater surfaces, and others were too low-boiling, and thus gave high evaporative ("drag-out") losses, in use.

The present invention provides a method of leak testing electrical or electronic components, by immersion in an inert liquid at a temperature above 100° C., to detect any bubbles arising from the component, characterised in that the component to be tested is immersed in a liquid comprising predominantly perfluoroperhydrofluorene, $C_{13}F_{22}$. The component is then removed from the liquid and drained. The sensitivity limit of this method is about $10^{-2}$ ccs/sec.

For greater sensitivity, both U.S. Military Standard 202F (test condition E) and U.S. Military Standard 883B (test conditions C and E) specify a test where the component is impregnated with an inert liquid boiling substantially below 100° C. (e.g. a fluorocarbon) before being immersed for leak testing. This causes the low-boiling liquid held in internal cavities to boil off as vapour bubbles during the leak testing process, increasing the sensitivity to about $10^{-5}$ ccs/sec.

Perfluoroperhydrofluorene is a known chemical compound, well described in the chemical literature (see, for example, Tetrahedron 1963, Vol. 19, pages 1893–1901). It is a water-white liquid whose salient physical properties are given in the following table:

| Physical Properties of Perfluoroperhydrofluorene | | |
|---|---|---|
| Property | Unit | Value |
| Molecular Weight | | 574 |
| Density (20° C.) | g/cm$^3$ | 1.984 |
| Density (30° C.) | g/cm$^3$ | 1.965 |
| Boiling Point | °C. | 190–192 |
| Pour Point | °C. | −70 |
| Viscosity (kinematic) (25° C.) | mm$^2$s$^{-1}$ | 4.84 |
| Viscosity (dynamic) (25° C.) | mPas | 9.578 |
| Surface Tension (30° C.) | mN/m | 19.7 |
| Vapour Pressure, 100° C. | m.bar | 47 |
| Vapour Pressure, 150° C. | m.bar | 293 |
| Vapour Pressure, 200° C. | m.bar | 1200 |
| Heat of vaporisation | kj/kg | 71 |
| Specific Heat | j/g/°C. | 0.92 |
| Thermal conductivity | mW/m °C. | 56 |
| Expansion coefficient (0° C.) | °C.$^{-1}$ | 0.00078 |
| Refractive index, N$^D$20 | | 1.3289 |
| Electrical resistivity | ohm/cm | 2.00 × 10$^{13}$ |
| Dielectric Strength | kV/2.5 mm gap | 50 |

The preparation of perfluoroperhydrofluorene is described in U.S. Pat. No. 2,459,780 to McBee et al (see Example 3), for example.

The electrical or electronic component to be tested is preferably impregnated with a relatively low-boiling liquid, prior to leak testing. Suitable low boiling liquids include, for example, FLUTEC PP50 (perfluoro n-pentane, boiling point 29° C.) and FLUTEC PP1 (perfluoro n-hexane, boiling point 57° C.), FLUTEC is a Registered Trade Mark of ISC Chemicals Limited.

The invention will be further described with reference to the following illustrative Example.

EXAMPLE

Testing of electronic components for integrity of sealing (a) Method used: U.S. Military Standard 202F, 8.7.82, method 112D (seal test condition D).

A number of electronic components with inadequate seals were tested according to the procedure laid down in the above method, using an already approved indicator fluid, i.e. FLUTEC PP9 (perfluoromethyldecalin, mixed isomers), and as an alternative fluid, perfluoroperhydrofluorene. Samples were immersed in the test fluid for a period of twenty seconds at 125° C. Four samples were tested, and the test was carried out three times on each sample.

The following results were obtained:

| Component No. | In FLUTEC PP9 | in perfluoroperhydrofluorene |
| --- | --- | --- |
| 1 | 45 small bubbles | 50 small bubbles |
| 2 | 31 large bubbles | 25 large bubbles |
| 3 | Very fast stream of small bubbles | Fast stream of small bubbles |
| 4 | Fast stream of small bubbles | Fast stream of small bubbles |

The same results were obtained on each sample when the test was repeated a second, and a third time. (b) Method used: U.S. Military Standard 883B, 31.8.77, method 1014, test condition C.

A number of electronic components that had failed the helium fine leak test were retested. This procedure involved leaving the components in a vacuum/pressure chamber for 2 hours at 75 lb/in$^2$ with FLUTEC PP1 (perfluoro n-hexane) as a detector fluid. The leaks were then indicated using the same procedure as for the components that had failed the fluorocarbon bubble test, i.e. immersion for 20 seconds at 125° C.

The following results were obtained:

| Component No. | in Flutec PP9 | in perfluoroperhydrofluorene |
| --- | --- | --- |
| 1 | Fast stream of small bubbles | Fast stream of small bubbles |
| 2 | Very fast stream of small bubbles | Very fast stream of small bubbles |
| 3 | Very fast stream of small bubbles | Very fast stream of small bubbles |
| 4 | Fast stream of small bubbles | Fast stream of small bubbles |

Conclusion

The above data confirm that perfluoroperhydrofluorene is a suitable medium for use in the test laid down in the U.S. military specifications defined above.

We claim:

1. A method of leak testing electrical and electronic components, comprising immersing a component to be tested in an inert liquid, said inert liquid predominantly being perfluoroperhydrofluorene, $C_{13}F_{22}$, at a temperature of above 100°, and detecting any bubbles arising from the component, appearance of bubbles being indicative of a leak.

2. The method according to claim 1, further comprising impregnating the component with a liquid boiling substantially below 100° C., before immersing the component for leak testing in said inert liquid.

3. The method according to claim 2, wherein said liquid boiling substantially below 100° C. is selected from the group consisting of perfluoro n-pentane and perfluoro n-hexane.

* * * * *